Figure 4:
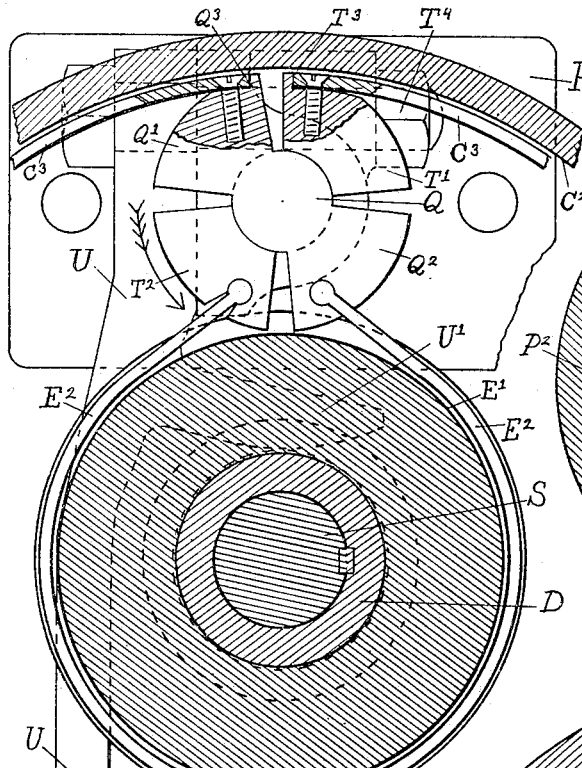

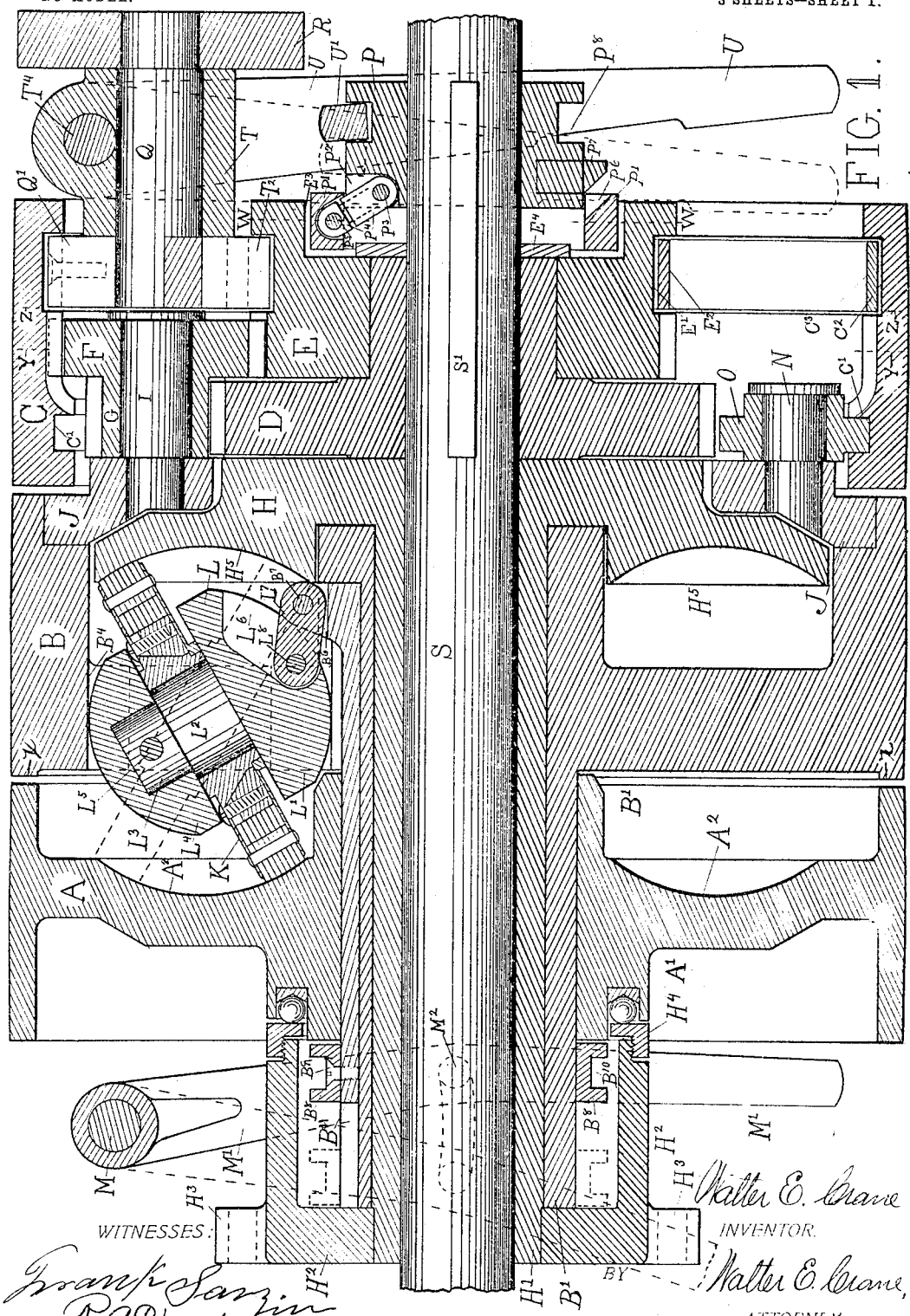

No. 766,757. PATENTED AUG. 2, 1904.
W. E. CRANE, DEC'D.
A. R. JOHNSON, ADMINISTRATOR.
VARIABLE SPEED DEVICE.
APPLICATION FILED NOV. 24, 1900.
NO MODEL. 3 SHEETS—SHEET 2.
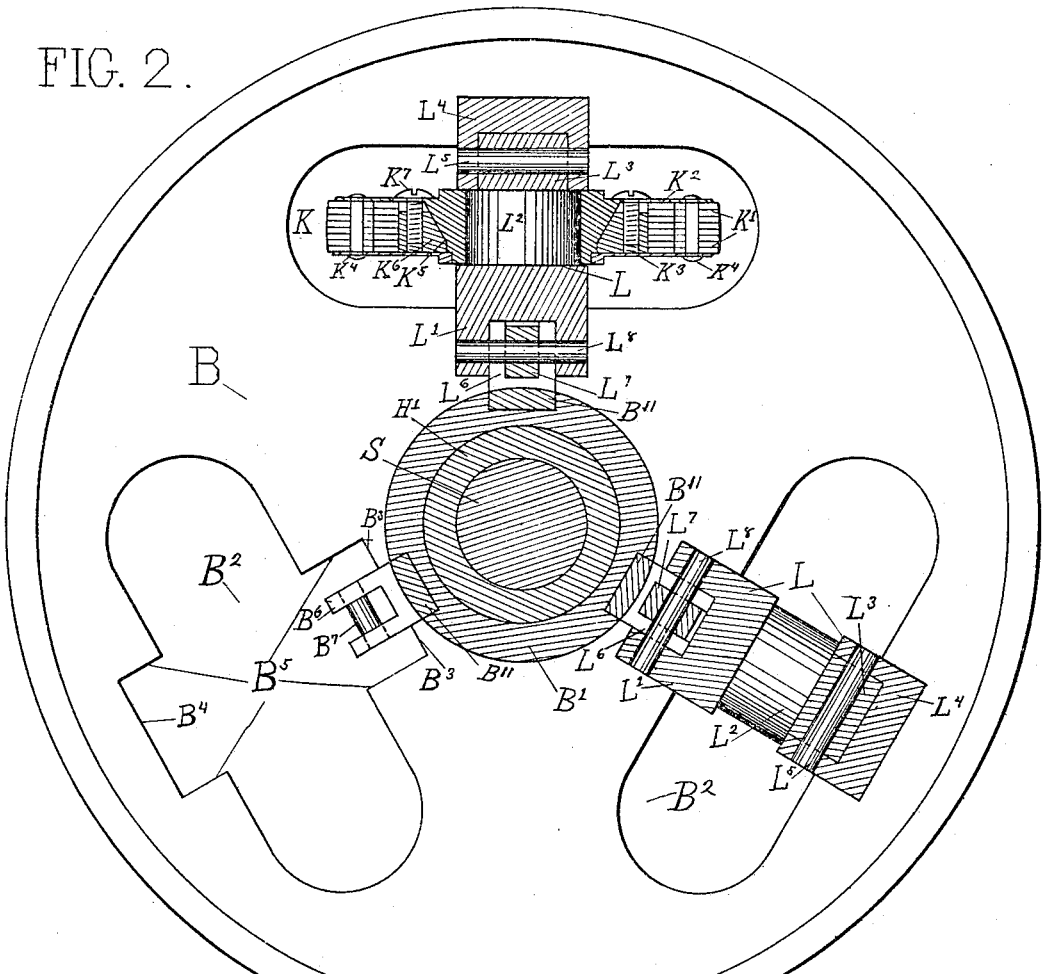
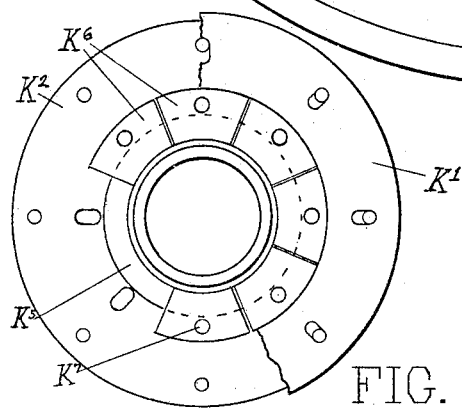
WITNESSES:
Frank Sanjin
R. A. Creek
Walter E. Crane,
INVENTOR.
BY Walter E. Crane,
ATTORNEY.

No. 766,757. PATENTED AUG. 2, 1904.
W. E. CRANE, DEC'D.
A. R. JOHNSON, ADMINISTRATOR.
VARIABLE SPEED DEVICE.
APPLICATION FILED NOV. 24, 1900.
NO MODEL. 3 SHEETS—SHEET 3.

WITNESSES:
Frank Sarjin
R. A. Creek

Walter E. Crane,
INVENTOR.
BY Walter E. Crane,
ATTORNEY.

No. 766,757. Patented August 2, 1904.

UNITED STATES PATENT OFFICE.

WALTER E. CRANE, OF DENVER, COLORADO; A. ROLAND JOHNSON ADMINISTRATOR OF SAID CRANE, DECEASED.

VARIABLE-SPEED DEVICE.

SPECIFICATION forming part of Letters Patent No. 766,757, dated August 2, 1904.

Application filed November 24, 1900. Serial No. 37,596. (No model.)

*To all whom it may concern:*

Be it known that I, WALTER E. CRANE, a citizen of the United States, residing at Denver, county of Arapahoe, and State of Colorado, (and whose post-office address is 1661 Lincoln avenue,) have invented a new and useful Improvement in Variable-Speed Devices, of which the following is a specification.

My present invention relates to improvements in variable-speed devices in which there are two or more rotary members, as pulleys, gears, or sprocket-wheels, for the reception and transmission of driving force, the said members being preferably mounted upon a central shaft, which may be either the driving or driven member. This variable-speed device constitutes two distinct means of variation of speed, one being a geared means giving stepped changes of speed and the other being a frictional means giving minute or gradual changes of either of the speeds of the geared means, the combination providing for any speed that may be desired within the range of the device, which has a capacity of eight to one in speed ratios.

The objects of this invention are, first, to produce a variable-speed device of such a nature that the heavier portion of the work of transmission embodied in the slower movements shall be positive; second, to provide a variable-speed device in which there shall be a frictional or gradual means for transmission of the lighter force in the more rapid movements of the device in order to effect all possible degrees of variation of speed; third, to provide a variable-speed device which shall be very compact and capable of being placed upon machines providing only limited space; fourth, to provide a variable-speed device in which the range of variation is very extensive, as is required in many machines—as, for instance, a lathe; fifth, to provide a variable-speed device which shall be instantly controllable both for the frictional means and for the step changes of the geared means, and, sixth, to provide a variable-speed device embodying a geared portion for the heavier part of the duty it is to perform, having frictional engaging and releasing means to avoid the jar of sudden changes for the different speed-ratio adjustments. I attain these objects by means of the mechanism hereinafter described, and illustrated in the accompanying drawings, forming a part of this specification, in which—

Figure 5:
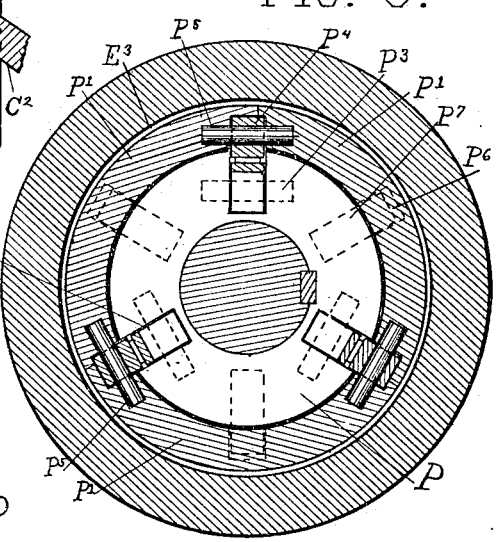
Figure 3:
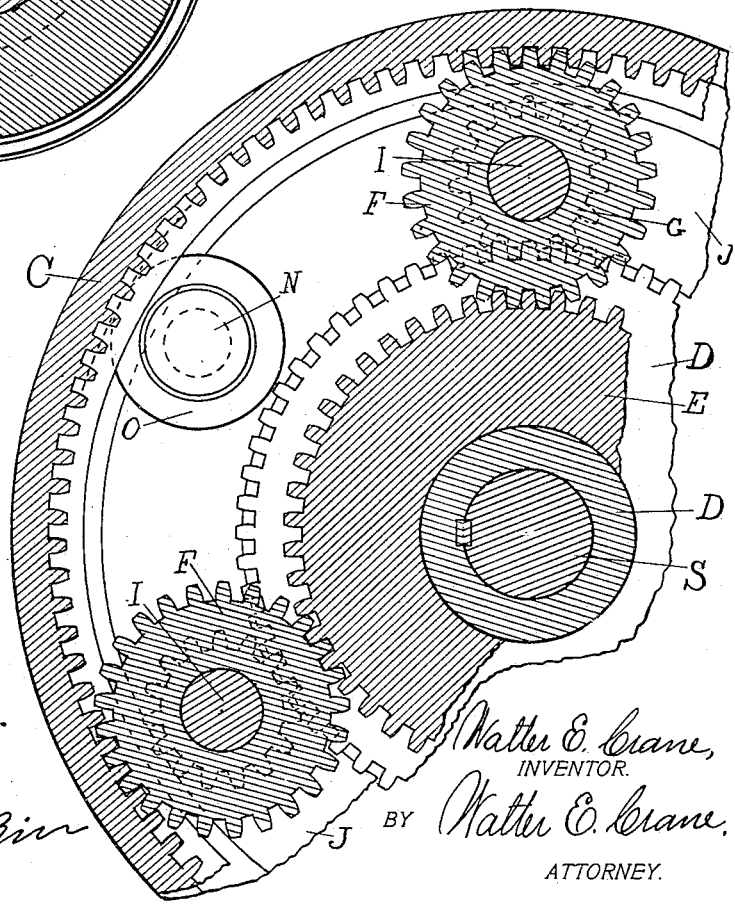

Figure 1 is a longitudinal sectional elevation of the device; Fig. 2, a transverse elevation, partly in section, on line X X of Fig. 1 and through the center of the friction-wheels and their carriers as seen looking to the right; Fig. 3, a partial transverse sectional elevation on line Y Y of Fig. 1 looking to the left therein; Fig. 4, a partial transverse sectional elevation on line Z Z of Fig. 1 and looking to the right therein; Fig. 5, a transverse sectional elevation of the shaft friction device on line W W of Fig. 1 and looking to the right therein; and Fig. 6, a view of the under side of the friction-wheel shown in Fig. 1 with the under plate removed and part of the friction material being broken away to show the upper plate and expansion-segments.

Similar characters designate like parts in all the figures of the drawings.

The principal revolving members preferably have peripheral driving-surfaces suitable for belts, though they may be gears or sprocket-wheels as well. I represent them in the drawings and this description as belt surfaces or pulleys as the preferred form.

A represents a speed-wheel, revolubly mounted to rotate about the central axis of the device, which is coincident with the center of the shaft S.

B represents a transmission-wheel or variation-wheel, mounted concentric with and for rotation in an adjacent parallel plane to the plane of revolution of speed-wheel A.

C represents an internal gear-ring, also revolubly mounted for rotation about the central axis of the device, and is supported from the variation-wheel B, as will be hereinafter explained. The periphery of ring C, as well as of wheels A and B, is suitable to having a belt run upon it, if so desired.

D represents the principal drive-gear of the device and is fixedly secured to the central shaft S, as by the key S', the said shaft S being either the principal driving source for the device or the shaft which the device is to drive at various speeds. In this preferred form as the driven shaft the description will first be given.

E represents a spur-gear revolubly mounted upon the hub of gear D and embodies also two separate friction-surfaces, one for engagement with a non-revoluble friction-band and the other for engagement with a friction device rotative with the shaft S, to be described later.

F represents a spur-gear, and G a spur-pinion, fixed together for simultaneous revolution upon a stud I, rigid in an annular ring J, secured to the variation-wheel B, and there are preferably two or more of the said studs I and the gears carried by them spaced equidistantly about the shaft S. The drawings represent three, but two would be equally effective. The location of the studs I is such that the gears F are in engagement with the spur-gear E at their inner side and in engagement with the internal annular gear C at their outer side, and the pinions G are of a suitable size to be in engagement with the drive-gear D at their inner side.

H represents a stationary or non-revoluble friction-disk located between the variation-wheel B and drive-gear D and in a plane parallel therewith and having a tubular extension H' encircling the shaft S, which is revoluble therein. Rigidly secured to the sleeve H' is a flange and end-thrust cap $H^2$, which is fixedly secured to some fixed object, as the frame of the machine to which the device is attached or the hanger-bearing of the shaft, (not shown,) being secured to the same by means of bolts or screws through the projecting lugs $H^3$. Disk H is a retarding-disk.

The variation-wheel B is revolubly mounted upon the sleeve H' and has a tubular extension or sleeve B' extending to the flange $H^2$, and the speed-wheel A is revolubly mounted upon this sleeve B', being provided at its outer end with an antifriction-bearing A', which is in engagement with a ring $H^4$, adjustably secured upon the cap $H^2$.

The speed-wheel A, friction-disk H, and variation-wheel B are the principal members of the friction element of the device, which constitutes a complete variable-speed device and is the subject of a separate application for patent of even date herewith and to which reference is made for modifications in some of the minor parts thereof.

The variation-wheel B is provided with a series of preferably three transmission or friction wheels K, which are rotatably mounted in oscillatable carriers inserted in openings $B^2$ through the web portion of the wheel B. The carriers are designated in a general way by L, and consist of the inner segment L', having the bearing portion $L^2$ and the cylindrical projection $L^3$, to which is fixedly secured the outer segment $L^4$ by means of the pin $L^5$. The inner segment L' has a longitudinal slot $L^6$, in which is pivotally secured the connecting-link $L^7$ by means of the pin $L^8$. The interior and exterior surfaces of the carrier L are in sustaining engagement with the surfaces $B^3$ and $B^4$, respectively, of the openings $B^2$, and the side surfaces of the carriers L are in guiding and driving engagement with the longitudinal surfaces $B^5$ of the said openings, in which the carriers are freely oscillatable.

The opposing surfaces of the web portion of the speed-wheel A and stationary disk H are formed into similar concave annular surfaces $A^2$ and $H^5$, and the curves of the said concave surfaces have coincident foci or a common center, and the center of oscillation of the series of carriers L is coincident with the said common center or foci. The transmission or friction wheels K, revolubly mounted in the said carriers, have a spherical periphery of a radius equal to the radius of the curve of the concave surfaces $A^2$ and $H^5$ and are in frictional contact therewith, being sustained in such frictional engagement by means of the end-thrust bearing A'.

The exterior of the sleeve B' is provided with a longitudinal slot for each of the friction-wheels of the series, and slidably mounted in the said slots are the controlling-slides $B^{11}$, which terminate at the inner ends in the raised portions $B^6$, which have the center portion cut away for the reception of the connecting-links $L^7$, pivoted therein by means of the pins $B^7$. The outer ends of the controlling-slides $B^{11}$ are secured to the interior of an annular controlling-ring $B^8$, as by means of the screws $B^9$.

Pivoted upon a stud or bolt M, which is fixed in some stationary part as a hanger-bearing for the shaft S, (not shown,) is a controlling-lever M', which is provided with pins $M^2$, projecting through slots in one or both sides of cap $H^2$, as represented in Fig. 1 by the curved dotted lines, the said pins $M^2$ projecting into the annular groove $B^9$ of controlling-ring $B^8$. By swinging the controlling-lever M' from the position shown to the dotted position the controlling-ring $B^8$ is moved to the dotted position and the friction-wheels K are inclined to their opposite position of inclination, as represented by the dotted lines in Fig. 1. The carriers L and friction-wheels K may be oscillated to any intermediate position by placing the lever M' in a corresponding intermediate position, which is readily done by the operator while the device is in operation. When constructed in the relative proportions shown, the adjustment of the carriers L and wheels K from one extreme position to the other causes a change of one-half in the relative speeds of the wheels A and B, or with the friction-wheels K in the position shown the speed-wheel A will revolve twice as fast with reference to the rotation of wheel B as when the wheels K are in their opposite extreme position, (represented by the dotted lines.)

The friction-wheels K are constructed in such a manner as to be expansible for adjustment for wear, the friction material K' being preferably of elastic material, as leather or paper, and being clamped between the opposing flanges $K^2$ and $K^3$ by means of screws or rivets $K^4$ passing through the said friction material in slotted holes, as shown in Fig. 6. The exterior of the hub is an inclined or conical surface $K^5$, and encircling the same is a series of segments $K^6$, having a corresponding inclined interior surface, the said segments being adjustable upon the inclined hub $K^5$ by means of adjusting-screws $K^7$, which pass through slotted holes in the flange $K^2$. The interior surface of the ring of friction material K' is in contact with the exterior of the segments $K^6$, and hence the said friction material will be expanded by tightening the adjusting-screws $K^7$.

The carriers L are free to move longitudinally in the openings $B^2$ and are retained in their proper central position therein by means of the friction-wheels K, in engagement with the concave surfaces $A^2$ and $H^5$, and the said carriers therefore adjust themselves centrally and equalize the pressure between the said friction-surfaces after adjustment of inclination of the carriers.

Fixedly secured in the side of the variation-wheel B outside of the disk H is an annular ring J, which has fixedly mounted in it two series of studs I and N, upon the studs I being revolubly mounted the double gears F and G, as previously stated, and upon the studs N are revolubly mounted a series of rollers O, preferably three in the series, located midway between the series of gears on studs I. These rollers O enter into the interior annular groove C' of the ring C and by their contact therewith support the said ring C revolubly from the wheel B. The central interior surface of the ring C is formed into an internal gear, which engages with the series of gears F, as previously stated. Beyond the internal gear the interior of the ring C is formed into an interior friction-surface $C^2$, and located within the same is a friction-band $C^3$, which will be more fully described later. The purpose of this frictional part of the ring C is to bring the said ring to a state of rest or prevent the same from revolving with the variation-wheel B to produce an accelerated movement of the shaft S from the rotation of the wheel B through the action of the double gears F and G and gear D, secured to the shaft S.

The periphery of the gear E adjacent to the gear portion is formed into an exterior friction-surface E', and surrounding the same is a friction-band $E^2$, which will be referred to later. The object of this frictional engagement of the exterior of gear E is to bring the same to a state of rest or prevent the same from rotation with the shaft S and gear D, upon which it is mounted, for the purpose of producing a reduced movement of the shaft S with reference to the wheel B through the effect of the double or reducing gears F and G as they are carried about the gears E and D by the studs I in the wheel B.

The outer portion of gear E has formed within it an interior friction-surface $E^3$, and the gear E is retained in position upon the hub of gear D by means of the washer $E^4$, which is secured in position in any desired manner, preferably by being secured by screws to the end of the said hub of gear D.

Slidably mounted upon the shaft S adjacent to the gear E is a friction member P, which is prevented from turning with reference to the shaft S by means of the key or feather S', and encircling the inner end of the member P there are a series of expansible friction-segments P', of which there are preferably three in the series, the said friction-segments being in position and adapted to engage with the friction-surface $E^3$ in the outer end of the gear E. The friction member P is provided with three radial slots $P^2$, into which are pivoted by the pins $P^3$ the adjustable links $P^4$, of which one part screws into the other and may be lengthened or shortened by turning the outer part half of a turn with reference to the inner part. The end portions of the friction-segments P' are cut away to receive the outer parts of the links $P^4$, which are pivoted in the said segments by means of the pins $P^5$. Diagonal clutch-notches $P^6$ are cut in the middle portion of the segments P', as shown in Fig. 5, and fixedly inserted in the clutch P are pins $P^7$, suitably shaped to enter and engage the said clutch-notches $P^6$, and thereby provide driving force for the ring consisting of the segments P'. Upon the clutch P being moved toward the gear E the links $P^4$ are tipped to a radial position because of the contact of the segments P' with the gear E, and in being so moved to a radial position they force outward the segments P' into driving engagement with the gear E. The clutch P is provided with an annular groove $P^8$, by means of which it is manipulated in the ordinary manner. The construction of this friction-clutch is such that it will readily remain in its operative position because of the links $P^4$ being carried fully to or slightly past the vertical position when the clutch is moved to the operative position. This friction-clutch may be termed the "shaft-clutch" or "shaft-friction" device, and its office is to secure the gear E to the shaft S and cause it to rotate therewith that the rotation of the wheel B may be communicated to the shaft S through the studs I, double gears F and G, and gears D and E without modifying the speed of the wheel B in the said connection to shaft S.

Fixedly secured in a plate R, which is secured to some stationary object, as to a hanger-bearing for shaft S, (not shown,) is a stud Q, whose radial position is in line with the center of the space between the friction-surfaces $C^2$ and $E^3$, and the inner end of the stud Q is an enlarged cylindrical portion the opposite quarters of which are cut away, leaving the portions $Q'$ and $Q^2$ shaped as shown in Fig. 4. To the outer part $Q'$ is secured one end of the friction-band $C^3$, and to the inner part $Q^2$ is secured one end of the friction-band $E^2$.

Oscillatably mounted upon the stud Q is a controlling-block T, the inner end of which is an enlarged cylindrical portion which has two opposite quarters cut away, leaving the portions $T'$ and $T^2$, which project into the space between parts $Q'$ and $Q^2$ and being in the same plane therewith. The cutting away of these parts is slightly more than a quarter in each case, and the portions $T'$ and $T^2$ therefore are permitted to oscillate slightly upon the stud Q.

Loosely secured to the portion $T'$ at its outer part is the opposite end of the friction-band $C^3$, and pivotally secured to the inner portion $T^2$ is the opposite end of the friction-band $E^2$. The friction-band $C^3$ abuts against shoulders $Q^3$ and $T^3$, which are adapted to force the friction-band $C^3$ outward upon the block T, being oscillated in one direction, and thereby to forcibly engage the friction-surface $C^2$ of the ring C and bring the same to a state of rest. By an opposite oscillatory movement of the block T, as indicated by the arrow in Fig. 4, the friction-band $E^2$ will be caused to forcibly engage the friction-surface $E'$, and will thus bring the gear E to a state of rest.

Passing through the upper portion of block T is a transverse stud or bolt $T^4$, by means of which a controlling-lever U is pivotally secured to the block T and by means of which the block is oscillated by the operator, the lever U being secured in either of the extreme positions of oscillation in any of the usual ways. The transverse movements of the lever U therefore operate either one of the frictions upon ring C and upon the exterior of gear E, and by means of the pivotal connection of the lever U to the block T and the curved transverse projection $U'$, which engages with the annular groove $P^3$, the longitudinal movement of the lever U is made to operate the friction-clutch P, by means of which the gear E is secured to the rotating shaft and gear D. It is thus evident that the lever U gives complete control of the geared part of the device and that the same can be made to give three distinct speeds of the shaft S with reference to the wheel B, and that the lever $M'$ gives complete control of the friction part of the device, by means of which gradual infinitesimal variations may be given to wheel B with reference to wheel A.

In case the gears are proportioned with one hundred teeth for the internal gear C, fifty teeth for the gear E, twenty-five teeth for the gear F, fifteen teeth for the gear G, and sixty teeth for the gear D then by setting the friction in the internal gear C and bringing the same to a state of rest the shaft will be rotated at a speed of two revolutions to one revolution of wheel B. By releasing the friction on C and setting it upon the periphery of E the shaft will revolve at one-half the rate of revolution of B. By releasing the friction on periphery of E and throwing in the friction-clutch, securing E to the shaft, the shaft will then revolve at the same speed as wheel B.

The friction device gives a speed ratio of from one and one-half to three of wheel A with reference to wheel B, and hence it follows that by operating the two controlling-levers the speed of the shaft S may be from fifty to four hundred revolutions of the shaft from a speed of three hundred revolutions of wheel A as a driving-wheel of the device.

The frictional part of the device embraced by the speed-wheel A, variation-wheel B, with its transmission-wheels, and the retarding-disk H has a speed-blending effect whereby the highest speed of the geared part of the device may be modified part way from its highest speed to its medium speed and then from that speed part way to its slowest rate of speed and then from that speed to its lowest speed.

The resultant speed of the device, either at the shaft S or at the speed-wheel A, is the product of the speed ratio of the geared speed-changing device and of the speed ratio of the frictional speed-changing device.

The gear F operates as a modifying-gear, and the gears C and E are, in fact, fulcrum-gears, the combined gears F and G constituting a continuous lever. The gears C and E produce effect when they are retarded or stopped and may appropriately be termed "retarding-gears" or "fulcrum-gears." The gear C may be supported from a stationary part of the device, as from a hanger-bearing instead of from the variation-wheel B, as shown, the essential condition being that it may be revolubly mounted.

The retarding-gears may be stopped by positive means in any of the usual ways instead of being arrested by the friction means shown, but will then give a less smooth effect in making the change from one speed to another. Either the frictional or the positive means for stopping these fulcrum or retarding gears may be termed a "retarding means."

An important feature of the frictional speed-modifying device is the expansibility of the transmission-wheels, whereby they may be adjusted as they wear, and thus be kept up to size, and therefore in proper and sufficient frictional engagement with the opposing frictional surfaces $A^2$ and $H^5$.

The whole device is capable of receiving its operative or driving force from the shaft S and of delivering its movement in any degree of modification from the speed-wheel A as a driven wheel or as the driving-wheel for a machine to be operated, and the device will thus be used where the requirements are to speed up considerably from the source of power.

The belt may be shifted from speed-wheel A onto variation-wheel B, and thus get a different speed and a positive speed or one in which there is no possibility of slipping of the transmission-wheels K. The belt may also be shifted past wheel B and onto wheel or ring C, when by securing the wheel E a still different speed may be obtained. It is also possible to have driving-belts from two or more of the wheels A, B, and C at one time to operate different machines or different parts of the same machine and at different speeds. It may likewise be convenient in some cases to drive the device from a suitable source of power to one of the wheels, as the variation-wheel B, and to deliver power from both the shaft S and the speed-wheel A, in which case the two resultant speeds will be independently adjustable. The device is, as will be apparent, a double or duplex device for securing speed variations and may be made to give two separate or factor results of one combined or product effect.

Having thus described my invention, I claim as new, and desire to secure by Letters Patent of the United States, the following:

1. In a variable-speed device, the combination with a positive stepped speed-changing device, embodying fulcrum-wheels arrested by friction means, of a frictional speed-modifying device, to modify the different speeds of the said stepped, speed-changing device.

2. In a variable-speed device, the combination with a speed-wheel and retarding-disk, of a variation-wheel and oscillatable transmission-wheels carried thereby; and a geared speed-changing device, to obtain any possible speed within the range of the device.

3. In a variable-speed device, the combination with a positive stepped speed-changing device, of a speed-wheel and stationary retarding-disk; and a bodily-rotatable transmission device having oscillatable members in operative engagement with opposing concave surfaces of said speed-wheel and disk.

4. In a variable-speed device, the combination, with a stepped, geared, speed-changing device, of a speed-wheel; a retarding-disk; and an intermediate variation-wheel, carrying a series of transmission-wheels.

5. In a variable-speed device, the combination with a stepped, geared speed-changing device, of a speed-wheel; a retarding-disk; an intermediate variation-wheel carrying a series of transmission-wheels; and means for oscillating said transmission-wheels.

6. In a device of the class specified, the combination, with a frictional speed-blending device, of a positive, stepped, speed-changing means; and frictional engaging means for operating the said positive means.

7. In a device of the class specified, the combination, with a frictional speed-blending device, of a positive, stepped, speed-changing means; and a separate friction means, for operating each of the speed changes of the said positive speed-changing means.

8. In a device of the class specified, the combination with a speed-wheel and retarding-disk, having complementary concave annular friction-surfaces, of an intermediate series of oscillatable and bodily-rotatable transmission members in engagement with said friction-surfaces; and a geared, stepped speed-changing device, operably connected with said series of transmission members.

9. In a device of the class specified, the combination with a speed-wheel and retarding-disk, of an intermediate variation-wheel, having a series of oscillatable transmission members in operative engagement with said speed-wheel and disk; a shaft-gear; bodily-rotatable gears carried by said variation-wheel and in engagement with said shaft-gear; and controlling means whereby three different relative speeds between said shaft-gear and said variation-wheel may be secured.

10. In a device of the class specified, the combination with a shaft-gear and a free gear concentric therewith, of a bodily-rotatable pinion and modifying-gear in engagement with said shaft-gear and free gear; a fulcrum-gear in engagement with said modifying-gear; a belt-pulley revoluble with said pinion and modifying-gear; a similar belt-pulley revoluble with said fulcrum-gear; and means for controlling said fulcrum-gear and free gear.

11. In a device of the class specified, the combination with a shaft-gear and a free gear concentric therewith, of a bodily-revoluble pinion and modifying-gear in engagement with said shaft-gear and free gear; a fulcrum-gear in engagement with said modifying-gear; controlling means for said fulcrum-gear and free gear; a variation-wheel revoluble with said pinion and modifying-gear; and a speed-wheel variably revoluble with reference to said variation-wheel.

12. In a device of the class specified, the combination with a speed-wheel having a belt-pulley, of a variation-wheel variably revoluble with reference to said speed-wheel, and also having a belt-pulley; a pinion and modifying-gear carried by said variation-wheel; a shaft-gear and a free gear concentric therewith in engagement with said pinion and modifying-gear; a fulcrum-gear in engagement with said modifying-gear; and means for controlling said free gear and fulcrum-gear, that a belt upon said variation-wheel may be positively driven at stepped speeds relative to said shaft-gear, and a belt upon said speed-wheel may be driven at gradually-varying speeds relative to said shaft-gear.

13. In a device of the class specified, the combination with a power-shaft, of a pair of similar pulleys, one embodying a speed-wheel and the other a variation-wheel variably revoluble therewith; a positive stepped speed-modifying device operatively connecting the said variation-wheel and shaft; and a fulcrum-wheel operatively engaging with said speed-modifying device and embodying a similar belt-pulley, that a belt may be run at stepped variations with reference to said shaft upon said fulcrum-wheel and said variation-wheel, and at graduated relative speeds upon said speed-wheel.

14. In a device of the class specified, the combination with a speed-wheel embodying a belt-pulley, of a variation-wheel variably revoluble with reference to said speed-wheel, and embodying a similar belt-pulley; a pinion and modifying-gear carried by said variation-wheel; a shaft-gear and a free gear concentric therewith in engagement with said pinion and modifying-gear; a fulcrum-gear in engagement with said modifying-gear, and embodying a similar belt-pulley; and friction means for stopping said fulcrum-gear and said free gear, and for revolubly connecting said free gear and said shaft-gear, that the power may be applied gradually to said belt-pulleys of the geared speed device, and different belt speeds be secured from a belt or belts on the respective belt-pulleys.

15. In a variable-speed device, the combination, with a rotatable drive-gear, of a pinion and modifying-gear mounted for bodily movement about said drive-gear; an internal gear in engagement with the outer side of said modifying-gear; a spur-gear in engagement with the inner side of said modifying-gear; a friction-band in position and adapted to stop the said internal gear; a friction-band in position and adapted to stop the said spur-gear; and a friction-clutch, in position and adapted to secure the said spur-gear to the said drive-gear, to revolve it therewith.

16. In a variable-speed device, the combination with a speed-wheel having a pulley-surface, and a stationary retarding-disk having similar concave annular friction-surfaces; an intermediate variation-wheel having a pulley-surface adjacent to that of the said speed-wheel; and a series of adjustable transmission-wheels carried by said variation-wheel in engagement with said friction-surfaces, that a belt may receive motion at a graduated variable speed upon the speed-wheel from that given it by the variation-wheel.

17. In a variable-speed device, the combination, with a revoluble speed-wheel and an opposing retarding-disk, having similar, annular, concave friction-surfaces upon the said speed-wheel and retarding-disk; an intermediate variation-wheel having a series of oscillatable carriers; a series of expansible transmission-wheels revolubly mounted in the said carriers, and in engagement with the said friction-surfaces; connecting-links pivoted in the said carriers; slides pivoted to the said links; and an annular controlling-ring secured to the said slides.

18. In a device of the class specified, the combination with a frictional speed-modifying device, of a stepped, geared, speed-changing device; a triplex controlling means for said geared device; and a controlling-lever, in position and adapted to give a higher speed ratio and a lower speed ratio by opposite transverse movements of the lever, and an intermediate ratio and a release, by opposite longitudinal movements of said lever.

In testimony whereof I have hereunto set my hand and seal, this 7th day of November, A. D. 1900, in the presence of two subscribing witnesses.

WALTER E. CRANE. [L. S.]

Witnesses:
Wm. Bond,
Alvin Marsh.